United States Patent
Murata

(10) Patent No.: US 8,732,731 B2
(45) Date of Patent: *May 20, 2014

(54) STREAMING SERVER ADMINISTRATION PROTOCOL

(75) Inventor: John Murata, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 12/730,000

(22) Filed: Mar. 23, 2010

(65) Prior Publication Data

US 2010/0299406 A1    Nov. 25, 2010

Related U.S. Application Data

(63) Continuation of application No. 09/680,991, filed on Oct. 6, 2000, now Pat. No. 7,716,674.

(51) Int. Cl.
*G06F 3/00* (2006.01)
*G06F 9/54* (2006.01)

(52) U.S. Cl.
CPC .............. *G06F 9/541* (2013.01); *G06F 9/548* (2013.01)
USPC .......................................... 719/328; 719/330

(58) Field of Classification Search
CPC ................ G06F 9/541; G06F 9/548
USPC .......................................... 719/310; 709/203
See application file for complete search history.

(56) References Cited

U.S. PATENT DOCUMENTS

| | | | |
|---|---|---|---|
| 5,657,446 A | | 8/1997 | Pinard et al. |
| 5,673,322 A | * | 9/1997 | Pepe et al. ................. 705/52 |
| 5,692,194 A | * | 11/1997 | Nguyen et al. ............... 719/310 |
| 5,732,219 A | | 3/1998 | Blumer et al. |
| 5,768,515 A | * | 6/1998 | Choquier et al. ............. 709/206 |
| 5,826,269 A | * | 10/1998 | Hussey ........................... 1/1 |
| 5,857,102 A | * | 1/1999 | McChesney et al. .......... 713/100 |
| 5,875,296 A | | 2/1999 | Shi et al. |
| 5,944,781 A | | 8/1999 | Murray |
| 5,987,504 A | | 11/1999 | Toga |

(Continued)

FOREIGN PATENT DOCUMENTS

| | | |
|---|---|---|
| EP | 0996253 A2 | 4/2000 |
| WO | WO 00/56055 | 9/2000 |

OTHER PUBLICATIONS

Bill Segall, Elvin has left the building: A publish/subscribe notification service with quenching, 1999.*

(Continued)

*Primary Examiner* — Lechi Truong
(74) *Attorney, Agent, or Firm* — Park, Vaughan, Fleming & Dowler LLP

(57) ABSTRACT

Network server information has traditionally been obtained through the use of operating systems functions and calls. By adding URL protocol code to the network server, such data may be obtained by use of a URL. In the URL, path information for the container in the server where such data resides is included. Specific server data may be retrieved, or such data may be retrieved recursively among several levels of containers. System calls and other functions may also be added to the URL path name for searching for particular data, or similar types of data through successive levels of containers. The protocol allows server administrators to access server data, in real time, from any user device in a network in which the server resides.

26 Claims, 1 Drawing Sheet

(56) References Cited

U.S. PATENT DOCUMENTS

| | | | |
|---|---|---|---|
| 5,999,943 A * | 12/1999 | Nori et al. .............................. 1/1 |
| 6,038,598 A * | 3/2000 | Danneels ....................... 709/219 |
| 6,061,678 A | 5/2000 | Klein et al. |
| 6,061,692 A * | 5/2000 | Thomas et al. ................ 707/613 |
| 6,094,679 A | 7/2000 | Teng et al. |
| 6,128,644 A | 10/2000 | Nozaki |
| 6,263,387 B1 | 7/2001 | Chrabaszcz |
| 6,327,608 B1 | 12/2001 | Dillingham |
| 6,557,024 B1 * | 4/2003 | Saito et al. ..................... 709/201 |
| 6,578,088 B2 | 6/2003 | Ohno et al. |
| 6,587,959 B1 | 7/2003 | Sjolander et al. |
| 6,622,170 B1 * | 9/2003 | Harrison et al. .............. 709/221 |
| 6,629,127 B1 | 9/2003 | Deen et al. |
| 6,757,711 B2 | 6/2004 | Toga |
| 7,089,489 B1 | 8/2006 | Brok et al. |
| 8,028,049 B1 * | 9/2011 | Ellis et al. ..................... 709/223 |
| 2001/0027492 A1 | 10/2001 | Gupta |

OTHER PUBLICATIONS

Park et al., "Web-Based Customer Network Management", 1997, pp. 160-169.

Riva et al., "LispWeb: A Specialized HTTP Server for Distributed AI Applications", 1996, Computer Networks and IDSN Systems 28, pp. 953-961.

Choi et al., "An Efficient Embedded Web Server for Web-Based Network Element Management", 2000, pp. 187-200.

Berners-Lee, "Hypertext Transfer Protocol—HTTP/1.1", 1999, pp. 1-114.

* cited by examiner

STREAMING SERVER ADMINISTRATION PROTOCOL

FIELD OF INVENTION

The present invention relates generally to protocols and more particularly to a network based administration protocol.

BACKGROUND OF THE INVENTION

Server administrators have traditionally used operating system commands, calls and functions to obtain internal server data. With these commands, the server administrator can typically display the server status, display the number of current connections and the detailed information for each connection, display the configuration options for the server, display the configuration options for each server module extension, modify the configuration options for server and module extension, display all server module extensions, display real-time statistics for the server, for example, average number of connections, what streaming applications are being selected and their frequency of selection, the current number of connections and bandwidth used, and display the entire server state for debugging and servicing of problems.

Examples of such configuration options referred to above include, the maximum number of connections allowed, the default server directory or list of directories, the maximum or minimum buffer size, the time interval for a process or function, the time duration for a process or function, error messages, enable or disable features, a file or list of files for a feature, or a user or list of users for a feature.

For example, based on the real-time number of connections returned by a streaming server, a web server can dynamically create URL's to different streaming servers to load balance across multiple servers or networks. In another example, based on the real-time file access returned by a streaming server, a web server providing an access page to the streaming servers can dynamically create browser URL's to allow, deny, or redirect access to different streaming files to load balance or control access to users.

Traditional tools available to server administrators, however, require a specific command or network request for a specific data element or set or set of data elements. In most cases, additional data access requires additional commands and changes to the server and administrator software. One disadvantage of a direct mapping between command and data is the lack of the ability for data discovery and a rigid connection between a particular tools's code and the server data it can retrieve, display or process. Furthermore, these tools generally consume server resources when run. The resource allocation for these tools may disadvantageously effect the performance of other applications running on top of the server operating system. When a server is streaming data into a computer network for transmission to the client, such limitations on the performance of the streaming application may disadvantageously result in the interruption of streaming data. For example, in a streaming video application, the interruption of data may result in perceptible distortion or pausing of a video image displayed on a user device connected to the network.

It would be desirous to provide a network software application like a streaming server which would allow server administrators to access server data from any user device in a network. It would be further desirous to provide a streaming server which would allow server administrators to access such data remotely in real time. It would be advantageous to software creators to provide a server data administration feature requiring a minimum of software changes to existing HTTP based software tools in order to gather information, change information or work with new information stored in a network software application

SUMMARY OF THE INVENTION

It is an object of the present invention to overcome one or more disadvantages and limitations of the prior art herein above enumerated.

It is a further object of the present invention to allow a single mechanism to add, set, delete or retrieve any required server data value.

It is yet another object of the present invention to use a query mechanism that defines an array iterator and name lookup.

It is still a further object of the present invention to allow for data discovery and retrieval of specific data elements.

According to the present invention, a novel protocol is implemented in a streaming server module for real time access to network software data from any location within a computer network in which the server resides. The novel protocol supports the use of standard network software programs like web server CGIs and HTTP client software like web browsers for accessing the data from any user device connected to the network or local to the server. The internal network software data structures are modified using the invention's protocol syntax to support a connected network client software program. The protocol relies on upon the URI mechanism for specifying a container entity using a path, and HTTP 1.0 for specifying request and response mechanisms. The goal of the protocol is to remove the usual administration protocol mapping between a command and the data it references, and replace this function with a simple HTTP based command with a URI formatted data specifier A feature of the present invention is that the server data is obtainable remotely through the network or locally at the server. A further feature of the present invention is that the administration protocol does not require network transport support.

Still further features of the present invention are the ability to provide within the protocol password protected access to the server data whether accessed locally or remotely and multiple simultaneous administrator requests. Another feature is that the protocol allows data discovery and retrieval with various data types, for example, character, integer and floating point.

Yet further features of the protocol of the present invention is the ability to provide read and write permissions to the information provided by the access to the server data, and the ability to modify the server state such as session, server and preferences.

Still further features are that the request and response for server data is formatted as an HTTP GET request and response. The response data from the server may also be HTML or XML formatted.

Additional features of the present invention is that the protocol allows for specific data requests of server data, server side data filtering, setting of server attributes, adding, removing and setting server data elements and values, and multiple filters per request for data coherency and performance.

These and other objects advantages and features of the present invention will become apparent to those skilled in the art from a study of the following Description of the Exemplary Preferred Embodiments when read in conjunction with the attached drawing and appended claims.

DESCRIPTION OF THE EXEMPLARY PREFERRED EMBODIMENTS

Figure 1:
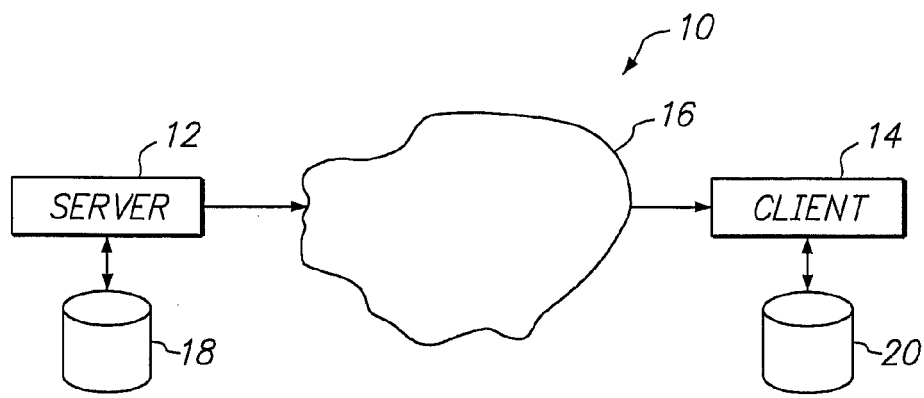
FIG. 1 is a schematic block diagram of a network constructed according to the principals of the present invention.

Referring now to FIG. 1, there is shown a computer network 10 constructed according to the principles of the present invention. Network 10 includes a server 12 and a client 14. the communication between the server 12 and the client 14 may be either directly connected or through another medium 16, which may be any of a local area network, wide area network, the Internet, or any other proprietary or public network. Each of the server 12 and client 14 respectively have associated therewith a computer readable medium 18, 20, for storing of programs which implement the processes, procedures and methods of the herein below described inventive protocol.

Figure 2:
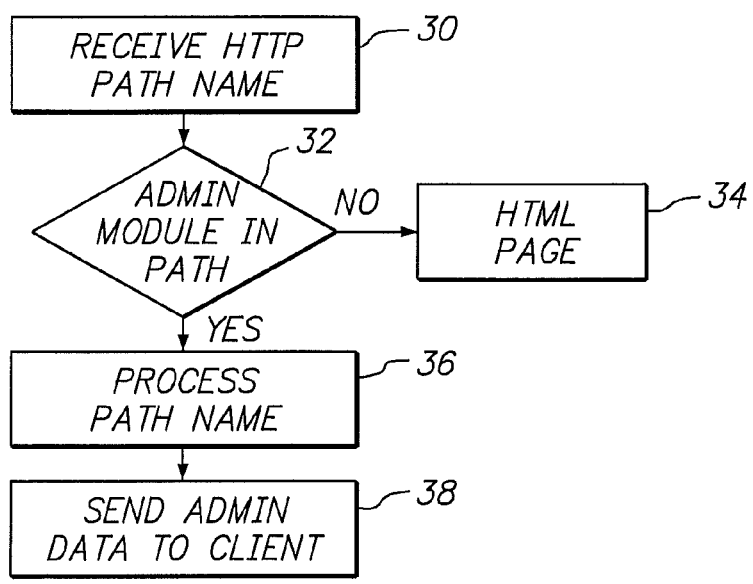
FIG. 2 is a flow chart of an exemplary process of the present invention.

With reference to FIG. 2, the server 12 receives an HTTP path name, as indicated at 30. At 32, a decision is made whether an administrative module is identified in the path name. If not and the path name identifies, for example, a typical HTML page, the server would send the HTML page, as indicated at 34. If yes, as indicated at 36, the server 12 process the novel protocol of the present invention, as described in detail herein below. After processing the HTTP path name identifying an administrative module, the administrative data is sent to the client 14, as indicated at 38.

The novel protocol of the present invention support use of CGI's or HTTP client software to develop monitoring and administration software to obtain server data of the type particularly useful to server administrators. To implement such a protocol, abstraction from the internal server data structure of the server on which the protocol resides is required as well as changes to such internal data structure, to support the requests described in greater detail herein below.

The novel protocol of the present invention also allows for network or local access by server administrators to internal server data. The protocol does not require network transport support. The protocol of the present invention relies upon the URI mechanism as defined by RFC2396 for specifying a container entity using a path and HTTP 1.0 RFC 1945 for specifying request and response mechanisms.

More specifically, access to internal server data may be obtained through client software by using the familiar path name of a URL in conventional client software, wherein the path name specifies a container from which such data may be obtained. For example, a path name may be written as URL/ module/admin/, wherein module/admin/ is the container. It will become readily apparent from the description herein below that the use of the URL can retrieve data from various levels of container data. The protocol of the present invention in addition to supporting the URL path name, also supports CGI scripting at the server so that commands may be added to the path name.

More specifically, requirements for the implementation of the novel protocol of the present invention are described herein below with respect to specific headings. For clarity and to enable those skilled in the art to practice the present invention, the syntax of the URI is also provided. Reference is made to the Drawing figures to give examples of various requests and responses using herein described protocol.

Request Methods

HTTP GET is the primary request method. HTTP POST can be used to perform multiple data requests.

Session State

The session is closed at the end of each HTTP request response.

Evaluation of POST

A POST Request-URI with a query parameter of command=SET is a set of server data. Body name="value" pairs are required and evaluated as discrete sets.

A POST Request-URI without a query parameter or a query parameter of command=GET is evaluated as a get of a data name or value. Body URL filters are not required.

Request Header Features

Authorization

If-Modified-Since

Specifying Server Data

All data on the server is specified using an URI

Definition of Server URL

Administration URL references directed to the server must specify the "/qtss" base segment and the admin module "/admin". The path names are significant for routing the request to the appropriate request handler.

For example, http://server:port/qtss/admin, references the qtss admin module which implements the admin protocol URI Requests Always absolute references beginning with the Server URL rule:

[absolute URL]? [parameters="value(s)"]+
    [option="value"]+[option="value"]

example:
/qtss/admin/server/sessions?parameters=rva+ snapshots="value"

URI Rules

/path=absolute reference path=relative reference path/=/is defined as any container in the "path" reference

*=iterate each element in the current location path/*=is defined as all elements contained in the "path" reference .=not supported ..=not supported ;=not supported ?=query options follow ("+" delimited name="value" pairs) spaces and tabs=stop characters " "=are supported from values and required for values containing spaces and tabs.

Path Definition

A path represents a virtual hierarchical data structure of containers and is expressed as a URL. The path terminates with an element. The terminating element may be a container.

Elements are arrays. If there is a single element in the array, then the following URL queries are equivalent: "path/element", "path/element/", "path/element/*", and "path/element/1" are all evaluated as the same query.

Query Options

A URI without a '?' defaults to a GET request example: /qtss/admin/server/sessioncount A URI containing a '?' designator must contain a "command=the command" query option.

example: /qtss/admin/server/sessioncount?command=GET

Query options are not case sensitive. Query option values are case sensitive. Unknown query options are ignored. Query options not required by a command are ignored.

command option:
command=[GET|SET|DEL|ADD]
Unknown command are reported as an error.
command=GET <- get data identified by URI. ("<-"=comment)
The GET does not require other query options
Example: GET /qtss/admin/maxcount
command=SET <- set data identified by URI
The command sets the element value referenced by the URL. The required query options are value=
value checking is not performed. Conversion between the text value and the actual value is type specific.
Example: GET /qtss/admin/maxcount?command=SET+value=5
optional query options for the SET command
type=<- if defined then type checking of the server element type and the set type is performed. If a match of the stored type and the request type fails, an error is returned an the command fails.
Example:
GET /qtss/admin/maxcount?command=SET+value=5+type=SInt32
command=DEL <- delete data identified by the URI. The command deletes the element referenced by the URL.
Example:
GET /qtss/admin/maxcount?command=DEL
command=ADD <- add data identified by the URI. If the element at the end of the URL is an element the ADD performs an add to the array of elements referenced by the element name.
Required query options are: value=and type=
example: GET /qtss/admin/maxcount ? command=ADD+value=6+type=SInt16+access=rw
optional query options for the ADD command are: access=
example: GET /qtss/admin/ ? command=ADD+value=5+name=maxcount type=SInt16+access=rw
If the element at the end of the URL is a QTSS_Object container, then an ADD performs a named element add to the container. Required query options in this case are: value=, type= and name=. Example: GET /qtss/admin/? command=ADD+value=5+name=maxcount type=SInt16
parameter options:
r=recurse -. walk downward in hierarchy (path?parameters=r and path/*?parameters=r are evaluated as the same query)
v=verbose -> return full path in name
a=access -> return read/write access
t=type -> return type of value
d=debug -> return debugging info with error
c=count -> return count of elements in path
Parameters are always single characters with no delimiters. Parameter options follow the URL, e.g., [URL]?parameters=[p][p],
example path/path?parameters=rvat
Data Types
Data types can be any server allowed text value. New data types can be defined and returned by the server. The data types are: Uint8, Sint8, Uint16, Sint16, Uint32, Sint32, Uint64, Sint64, Float32, Float64, Bool8, Bool16, CharArray, QTSS_Object, and void_pointer. QTSS_Objects, pointers and unknown data types always convert to a host ordered hex value. The values converted are returned in hex. AN example is when adding a new attribute to the server. If the type is not known by the server, then the value returned will be a string of hex values.

Snapshots
A snapshot is the container of values from which an admin response is generated (the measured values at a particular point in time, as compared to the constantly changing values). There is one active snapshot per admin connection. Each request without a snapshot in the URI generates a new snapshot. There is only one current snapshot per request. Each new snapshot invalidates the previous per admin connection snapshot. A snapshot is a hierarchy of containers specifying the type, name, value and read/write attribute of values copied from the server's internal structures using the module API (Application Program Interface)

Snapshots are always complete copies of the referenced resources, however, the returned data can be filtered by specifying the desired fields in the body of a request.

Response appears as SNAPSHOT:Value
Request Definitions
A GET without a snapshot query value is a request which automatically makes a new snapshot. If the snapshot is not returned by the server, then snapshots are not supported.

A POST contains the default set of objects in the URL. The POST body can contain multiple sub URL's performing multiple SET, GET or DEL command operations on the set of data represented by the default URL.

Query Options
Options appear at the end of the URI example: path segment/path segment?option="value",option="value"
URI POST Filters
Filters specify a subset of data to be returned on each request. Multiple filters are evaluated in order with each result placed in the response.

Once a filter accepts a value, it is returned.
Order of appearance when recursing is breadth first. Filter defined attributes replace any previous attributes settings for each filter response. The request URI is the default filter. New filters override the parameters defined by the request URI.
Response Data
All entity references follow the form [NAME=VALUE]; [attribute="value"], [attribute="value"]
NAME=VALUE
NAME=VALUE; attribute="value"
NAME=VALUE; attribute="value"; attribute="value"
All container references follow the form [NAME/]; [attribute="value"],[attribute="value"]
NAME/
NAME/; attribute="value"
NAME/; attribute="value"; attribute="value"
Root Value
/admin
Errors in Response
The error state for the request is always reported with each response at the end of the data.
Error:(0),- no error
Error: (404) <- data not found
Setting Entity values
When changing server values, the entities' name and their values are located in the request body. If a match is made on an entity name, including the URL base at the container level, then the value is set in the server provided the read/write attribute allows the set.
base=base/container
name=value
/base/container/name="value"

There has been described herein above a novel protocol for obtaining administrative server data using client software which transmits a URI to the server. Those skilled in the art may now make numerous uses of and departures from the exemplary preferred embodiments disclosed herein without departing from the inventive concepts of the present invention. Accordingly, the present invention is to be defined solely by the scope of the appended claims.

What is claimed is:

1. A method for obtaining internal server data from a server, the method comprising:
   in the server, performing operations for:
      determining whether a path name received in a request from a client includes an identity of a container of the server, the container comprising administrative data about the server;
      when the path name does not include the identity of the container, transmitting an HTML page from the server;
      when the path name includes the identity of the container:
         processing the path name to retrieve a snapshot of the container, the snapshot representing a current copy of content in the container, the snapshot comprising a hierarchy of containers specifying types, names, and values using an API (Application Program Interface);
         generating, from the snapshot, a response including the administrative data associated with the path name; and
         transmitting the response from the server to the client.

2. The method of claim 1, wherein an administrative module of the server one or more of:
   determines whether the path name includes the identity of the container; and
   processes the path name to retrieve the snapshot.

3. The method of claim 1, wherein the server modifies information included in the container based on the path name.

4. The method of claim 3, wherein the server modifies the information based on a command and a value included in the path name.

5. The method of claim 1, wherein the path name indicates a virtual hierarchical data structure of containers.

6. The method of claim 1, wherein the snapshot further comprises read/write attributes of information included in the container.

7. The method of claim 1, wherein the server filters data in the response to return a subset of data from the snapshot based on the path name and at least one of a plurality of filters in the request.

8. The method of claim 1, wherein the path name is an HTTP path name.

9. The method of claim 1, wherein a new snapshot is generated when no snapshot is included in the path name of the request, the new snapshot invalidating a previous snapshot.

10. A non-transitory computer-readable storage medium storing instructions that, when executed by a server computer, cause the server computer to perform a method for obtaining internal server data from the server computer, the method comprising:
   determining whether a path name received in a request from a client includes an identity of a container of the server, the container comprising administrative data about the server;
   when the path name does not include the identity of the container, transmitting an HTML page from the server;
   when the path name includes the identity of the container:
      processing the path name to retrieve a snapshot of the container, the snapshot representing a current copy of content in the container, the snapshot comprising a hierarchy of containers specifying types, names, and values using an API (Application Program Interface);
      generating, from the snapshot, a response including the administrative data corresponding to the path name; and
      transmitting the response from the server to the client.

11. The computer-readable storage medium of claim 10, wherein the server modifies information included in the container based on the path name.

12. The computer-readable storage medium of claim 11, wherein the server modifies the information based on a command and a value included in the path name.

13. The computer-readable storage medium of claim 10, wherein the path name indicates a virtual hierarchical data structure of containers.

14. The computer-readable storage medium of claim 10, wherein the snapshot further comprises read/write attributes of information included in the container.

15. The computer-readable storage medium of claim 10, wherein the server filters data in the response to return a subset of data from the snapshot based on the path name and at least one of a plurality of filters in the request.

16. The computer-readable storage medium of claim 10, wherein the path name is an HTTP path name.

17. The computer-readable storage medium of claim 10, wherein a new snapshot is generated when no snapshot is included in the path name of the request, the new snapshot invalidating a previous snapshot.

18. A server computer that provides internal server data, comprising:
   a processor, wherein the processor performs operations for:
      determining whether a path name received in a request from a client includes an identity of a container of the server, the container comprising administrative data about the server;
      when the path name does not include the identity of the container, transmitting an HTML page from the server;
      when the path name includes the identity of the container:
         processing the path name to retrieve a snapshot of the container, the snapshot representing a current copy of content in the container, the snapshot comprising a hierarchy of containers specifying types, names, and values using an API (Application Program Interface);
         generating, from the snapshot, a response including the administrative data associated with the path name; and
         transmitting the response from the server to the client.

19. The server computer of claim 18, wherein the processor performs operations for an administrative module that one or more of:
   determines whether the path name includes the identity of the container; and
   processes the path name to retrieve the snapshot.

20. The server computer of claim 18, wherein the processor performs operations for modifying information included in the container based on the path name.

21. The server computer of claim 20, wherein the processor performs the operations for modifying the information based on a command and a value included in the path name.

22. The server computer of claim 18, wherein the path name indicates a virtual hierarchical data structure of containers.

23. The server computer of claim 18, wherein the snapshot further comprises read/write attributes of information included in the container.

24. The server computer of claim 18, wherein the processor performs operations for filtering data in the response to return a subset of data from the snapshot based on the path name and at least one of a plurality of filters in the request.

25. The server computer of claim 18, wherein the path name is an HTTP path name.

26. The server computer of claim 18, wherein a new snapshot is generated when no snapshot is included in the path name of the request, the new snapshot invalidating a previous snapshot.

* * * * *